United States Patent [19]

Gillberg-LaForce et al.

[11] Patent Number: 5,049,275
[45] Date of Patent: Sep. 17, 1991

[54] MODIFIED MICROPOROUS STRUCTURES

[75] Inventors: Gunilla E. Gillberg-LaForce, Summit; Eric M. Gabriel, Lebanon, both of N.J.

[73] Assignee: Hoechst Celanese Corp., Sommerville, N.J.

[21] Appl. No.: 539,096

[22] Filed: Jun. 15, 1990

[51] Int. Cl.$^5$ .................. B01D 67/00; B01D 71/00
[52] U.S. Cl. ................................. 210/500.27; 264/48
[58] Field of Search .................. 210/500.35, 643, 634, 210/639, 644, 649, 500.21, 500.27, 500.29–500.32, 500.35, 500.36, 500.4–500.43; 264/48, DIG. 48, DIG. 62

[56] References Cited

U.S. PATENT DOCUMENTS 3,926,864  12/1975  Hodgdon .................. 210/500.35
4,262,041  4/1981  Eguchi et al. .................. 210/500.41

Primary Examiner—Frank Sever
Attorney, Agent, or Firm—James L. McGinnis

[57] ABSTRACT

A pore modified microporous membrane is disclosed which is made by the process of incorporating a polymerizable vinyl monomer within the pores of a microporous membrane followed by polymerization to secure the resulting polymer within the pores. The process is particularly suitable for modifying a hydrophobic microporous membrane with a hydrophilic polymer, as occurs for example when polyacrylic acid is secured into the pores of a polypropylene microporous membrane. In further applications of the present invention, the inventive method may be used to produce liquid membrane supports for use with or without active carriers.

42 Claims, No Drawings

MODIFIED MICROPOROUS STRUCTURES

TECHNICAL FIELD

The present invention relates generally to microporous membranes wherein the properties of the membrane are modified by incorporating a vinyl polymer within the pores.

BACKGROUND

Microporous membranes are well known to those skilled in the art. These membranes are fabricated from organic polymers as thin films or hollow fibers with continuous networks of interconnected pores leading from one surface to the other. The rate at which solvent, ions, monomer and polymer molecules, and other small particles pass through the pores depends not only on pore size but also on mutual attractions and repulsions between the membrane material and the materials in the pores. These membranes can be used for the separation of very small particles, such as colloids and polymers, from each other or from the liquid in which they are suspended. They are also useful as separators in rechargable batteries, wherein two electrodes must be physically separated from each other in such a way that there is a continuous pathway for exchange of small ions without the mixing of reactants and products of the two half-cell reactions. These types of membranes can also be used in applications in which gas diffusion is desired, as in blood oxygenators, wherein the membrane has a liquid in contact with one surface and a gas in contact with the other surface. Other biological and medical applications of microporous membranes include bioreactors, in which the membrane provides a medium in which a biologically active substance can act on a solution, converting reactants to products without the biologically active substance becoming dispersed in the product solution; and blood dialysis, where waste products are removed from blood. Finally, microporous membranes have been used as supports for liquid membranes, wherein a liquid which is imbibed in the pores of the microporous membrane is the medium through which transport takes place. Stable liquid membranes are inherently difficult to make.

Microporous membranes are made from organic polymers by a variety of different methods. Organic polymers that are currently used to make microporous membranes include cellulose esters, as for example cellulose acetate; polyvinyl chloride; polysulfones and other high temperature aromatic polymers; polytetrafluoroethylene; polyolefins, including polypropylene and polyethylene; polycarbonates; polystyrene; and nylons. Because of the complexity of fabricating polymers into microporous membranes, it is often difficult to select a polymer for a specific application based on the physical and surface properties of the polymer and then fabricate that polymer into a membrane. This most often is the case when water wettability is desired, as is usually true for biological applications. Most organic polymers are not wetted by water. Many polymers that are wetted by water, as for example, polyacrylic acid, have physical properties that make fabrication of microporous membranes impractical. Therefore, practitioners in the art have strived to develop methods to modify the surface properties and especially water wettability of the readily available microporous membranes.

One method of modification of the surface behavior of a microporous membrane is treatment with a surfactant. As an example, Hoechst Celanese Corporation, the assignee of the present invention, manufactures and sells polypropylene microporous membranes under the name Celgard ®, a registered trademark of Hoechst Celanese Corporation. While polypropylene is not wetted by water, some of the commercial Celgard ® products are wetted by water because they have been treated with surfactants. A second approach that has been described in the patent literature is the application of thin films of polymers to microporous membranes. This is most simply done by treatment of a microporous membrane with a polymer solution, followed by removal of the solvent. In both of the approaches described above, loss of wettability can occur due to dissolution or leaching of surfactant or polymer.

A third general method that is described in the literature involves the covalent grafting of monomeric or polymeric materials onto the surface of the membrane by chemical treatment. For example, European Patent Application 302,650 describes a method for converting a hydrophobic polyolefin hollow fiber microporous membrane to a hydrophilic membrane by the grafting of polyvinyl alcohol onto the inner and outer surfaces. The method consists of irradiation of the hollow fiber with ionizing radiation, followed by reaction with vinyl acetate and then hydrolysis. U.S. Pat. No. 4,340,482 teaches a method for converting a polyvinylidene fluoride microporous membrane to a hydrophilic membrane by treatment with a highly basic solution of glycine, whereby the glycine is grafted onto the surface of the membrane.

A fourth method of modifying membranes involves reactions of monomers or oligomers with other monomers that have highly reactive functional groups. This leads to polymerization or crosslinking. For example, U.S. Pat. No. 3,744,642 describes a reverse osmosis membrane that is made by the interfacial condensation of a diamine and a diacid chloride within a porous substrate made of paper, glass fibers, or polymeric fibers, yielding a composite polyamide membrane. U.S. Pat. Nos. 3,951,815, 4,039,440, and 4,337,154 all are directed to the synthesis of composite reverse osmosis membranes by the crosslinking of amine containing polymers within a porous substrate. Although the polymerizations are carried out in porous substrates, the resulting membranes are not in general microporous.

The above-described approach has been further extended to include polymerizations and crosslinking reactions in the pores of microporous membranes in order to entrap the water soluble polymers within the pore networks, thus rendering the hydrophobic membranes hydrophilic. U.S. Pat. No. 4,113,912 teaches that a fluorocarbon microporous membrane, such as polyvinylidene fluoride, can be made hydrophilic by filling the pores with an aqueous solution of a water-soluble polymer, as for example polyacrylic acid, polyacrylamide, or polyvinyl alcohol, and then subjecting the polymer-treated membrane to reagents and conditions that lead to insolubilization of the polymer, generally by crosslinking. European Patent Application 257,635 teaches that hydrophobic membranes, with fluorocarbon membranes used as examples, can be rendered hydrophilic by filling the pores with an aqueous solution containing one or more hydrophilic polyfunctional amine- or hydroxy-containing monomers or polymers, such as water-soluble cellulose derivatives or polyvinyl alcohol, along with crosslinking agents and optional catalysts, surfactants and initiators. The solutions described above are formulated with the goals of improving penetration of the pores and also of inducing crosslinking to take place or causing the hydrophilic compound to chemically bind to the fluorocarbon substrate.

It is an object of the present invention to provide a broadly applicable method for modifying microporous membranes by the polymerization of vinyl monomers that are incorporated in the porous network of the membrane in organic or aqueous solvents to a high enough molecular weight that they can't be removed from the pores, thereby producing stable pore-modified membranes.

It is a further object of the present invention to provide liquid membranes that are stable under conditions of use. Still further objects of this invention are to provide stable battery separators and stable hydrophilic bioreactors that use the pore-modified structure of the current invention.

These and other objects as well as the scope, nature and utility of the invention will be apparent to those skilled in the art from the following Detailed Description and Appended claims.

SUMMARY OF THE INVENTION

The current invention as described in detail hereinbelow is characterized by a process for modifying the properties of a microporous membrane which includes the steps of first providing a microporous membrane, then incorporating a polymerizable vinyl monomer and a polymerization initiator into the pores of the microporous membrane, and finally polymerizing the vinyl monomer so that the polymerized monomer is secured in the pores. The polymerized monomer is firmly secured in the pores of the membrane by adjusting the conditions of polymerization so that the polymer molecules do not escape from the tortuous porous network.

The polymerizable vinyl monomer consists of one or more monofunctional vinyl monomers and an optional multifunctional vinyl monomer which can act as a crosslinking agent. The conditions under which polymerization takes place can be conveniently selected by choosing the appropriate initiator. Optionally, polymerization can be induced by the use of gamma-irradiation or an electron beam, in which case initiator is not needed. Aqueous or organic solvents can be used in the present invention. The method is useful for modifying hydrophobic microporous membranes with hydrophilic monomers, as occurs for example when microporous polypropylene membranes are modified by filling the pores with acrylic acid followed by free radical polymerization. The method can also be used to incorporate lipophilic polymers into a porous membrane to modify the membrane properties.

The membranes made by this method are themselves a unique invention, being stable to severe agitation and large pressure gradients. They can be advantageously used in microfiltration, ultrafiltration, and reverse osmosis. They are particularly useful as battery separators and bioreactors. In another embodiment the incorporated polymer forms a gel with a liquid which is present as solvent during polymerization or is added later. The gel is composed primarily of the liquid component, and the transport properties of the gel are primarily those of the liquid. The microporous membrane, incorporated gel, and optional dissolved carrier constitute a sturdy supported liquid membrane, the liquid being firmly held in the pores by the gel.

To provide further illustration and description, the present invention is described in detail below in connection with multiple examples.

DETAILED DESCRIPTION OF THE INVENTION

The microporous membranes that are used in connection with the following examples are well known in the art. These microporous membranes are fabricated from organic polymers in such a way that they have continuous networks of interconnected pores which extend from one outer surface to another. They are thus referred to as open celled films. Close celled films, in which the pore network does not connect the surfaces, can also be modified by the methods of the present invention. Open celled films are preferred.

These microporous membranes are generally fabricated in the form of films or hollow fiber. In the case of hollow fibers, the pore networks interconnect the inside and the outside of the tube-like hollow fiber. Microporous membrane films can be used as films, or they can be reinforced with woven or non-woven fabrics to provide additional strength.

The membranes can be composed of many different materials including cellulose esters, such as cellulose acetate, cellulose nitrates, polyvinyl chloride, polycarbonates, polysulfones and other high temperature aromatic polymers, polyacrylonitrile, polyesters, nylons, polyolefins, fluorinated polyolefins, polystyrene, substituted polystyrenes, and mixtures of these polymers. Polypropylene, polyethylene, polysulfones, polycarbonates, polyvinyl chloride, polytetrafluoroethylene, polyvinylidene fluoride, polystyrene, and mixtures of these polymers are preferred for the present invention. The use of a microporous polypropylene membrane, such as Celgard ® microporous membrane, manufactured by Hoechst Celanese Corp., is particularly preferred.

Many methods are available for producing microporous membranes and are well known in the art. For example, Celgard ® polypropylene microporous membranes can be purchased from Hoechst Celanese Corporation, Separations Products Division, South Point, N.C. Preparation of polypropylene microporous membrane involves drawing or stretching a crystalline, elastic polypropylene precursor film at ambient temperatures in the amount of about 10 to about 300 percent of its original length, followed by heat setting of the drawn film under tension such that the film is not free to shrink or can shrink only to a limited extent. This method of manufacture is described in detail in U.S. Pat. Nos. 4,438,185, 4,359,510 and 3,426,754, which patents are herein incorporated by reference. Many other methods are known for making microporous membranes composed of other materials, including the methods taught in U.S. Pat. Nos. 3,558,764, 3,843,762, and 3,920,785, and British Patents No. 1,180,066 and 1,198,695, all of which are herein incorporated by reference.

Furthermore, microporous membranes other than Celgard ® microporous membranes are available from manufacturers other than the assignee of the present invention. They are available in a wide variety of materials and are well known to workers of skill in the art.

The microporous membranes that are used in the current invention typically have porosities of about 30% to about 70%, with the preferred porosity being about 40% to about 50%. Porosity is defined herein as the fractional volume (as a percent) of the membrane that is open pore rather than substrate material. The sizes of the pores are highly variable, depending on the substrate membrane material and the process used for fabrication of the microporous membrane. Dimensions of pores in either length or width can range from less than about 0.01 microns to greater than about 10 microns. Preferred dimensions range from about 0.02 microns to about 2 microns. In the most preferred embodiment, using polypropylene microporous membrane as a substrate, the pores are elongated with the length and width of the pores ranging from about 0.2 to 0.6 microns and about 0.02 to 0.06 microns respectively. Microporous membrane films also can be made in a wide variety of thicknesses. Preferred thickness ranges are about 0.1 micron to about 1 micron, the most preferred range being about 0.15 to about 0.35 microns.

The pores of the above-described microporous membranes are modified by incorporating a polymerizable vinyl monomer and an initiator, followed by polymerization. An important variable in this invention may be the molecular weight of the polymer. It is believed that polymerization must be carried out to a molecular weight high enough that the polymer cannot escape from the tortuous porous network, either because the polymer molecules or particles are larger than the pore openings or because the polymer has become insoluble. A reason for believing that high molecular weight is necessary is that polymer made by the method of the current invention but external to the pore network had a molecular weight of 60,000 or higher whereas it was already known that low molecular weight polyacrylic acid could readily pass through the pore network. The addition of a crosslinking agent, even in small amounts, increases molecular weight and thus serves to better secure the polymer within the pores. Crosslinking also decreases solubility, further securing the polymer in the pores. Excessive amounts of crosslinking agent, however, lead to a product wherein the polymer is easily removed from the pores in the form of small polymer particles under conditions of severe agitation (ultrasonication).

Gelation of the polymer under conditions of use may also be important in stabilizing the polymer in the porous network. Polyacrylic acid, the monomer chosen for experimentation, gels in water, and as a result may be more completely immobilized within the porous network when it is wet. Excessively cross-linked polymers can lose their ability to gel; this might explain why highly crosslinked polyacrylic acid is removed under ultrasonication.

In one embodiment of the current invention, the polymerizable vinyl monomer is monofunctional, which means that each molecule has only one polymerizable group. Vinyl monomers are defined as monomers with a carbon to carbon unsaturated bond which reacts with other unsaturated molecules, yielding a polymer wherein the carbon to carbon bonds have become less unsaturated, that is double bonds have become single bonds and triple bonds have become double bonds. These typically polymerize in the presence of an initiator, which causes polymerization to occur through intermediates that are generally free radicals, anions, or cations. Initiators are typically activated by exposure to a source of energy, such as visible light, ultraviolet light, gamma irradiation, electron beam irradiation, heat, or combinations of these, depending on the nature of the specific initiator. In addition, gamma or electron beam irradiation alone is often sufficient to initiate a free radical polymerization, even without an additional initiator.

Monofunctional vinyl monomers that can be used include, but are not limited to, acrylic acid, methacrylic acid, styrenesulfonic acid, aminostyrenes, acyloxystyrenes, alkoxystyrenes, vinyl acetate, acrylamide, methacrylamide, acryloyl chloride, allyl acrylate, allyl alcohol, allyl glycidyl ether, 2-ethoxyethyl acrylate, 2-ethoxyethyl methacrylate, 2-hydroxyethyl acrylate, 2-hydroxyethyl methacrylate, 2-dimethylaminoethyl acrylate, 2-dimethylaminoethyl methacrylate, polyethylene glycol monoacrylate, polyethylene glycol monomethacrylate, methoxyethyl vinyl ether, sodium ally sulfonate, vinyl benzoic acid, N-vinylimidazole, vinylpyridine, N-vinyl-2-pyrrolidinone, 2-acrylamidoglycolic acid, 2-acrylamido-2-methyl-1-propanesulfonic acid, acrolein, acrolein dialkyl acetals, acrylonitrile, methacrylonitrile, methyl acrylate, methyl methacrylate, itaconic acid, maleic acid, fumaric acid, and mixtures thereof. Some of the above-named monomers have more than one reactive functional group, but one reactive group is generally much more reactive than the other, so that the monomer still behaves as a monofunctional monomer during polymerization. Some of the monofunctional vinyl monomers in the above list of examples can be classified as oligomers or low molecular weight polymers in the sense that they contain several monomer units joined together, as for example polyethylene glycol methacrylate. They are nevertheless monomers for the present invention as long as they have a single polymerizable vinyl moiety. The molecular weight of the oligomeric monomer should be low enough that the monomer can penetrate the pores of the microporous membrane.

The preferred polymerizable monomers of the present invention include acrylic acid, methacrylic acid, acrylamide, methacrylamide, and vinyl acetate. Acrylic acid is a preferred monomer because polymerization of this in a microporous polypropylene membrane causes the intrinsically hydrophobic polypropylene membrane to become hydrophilic due to the presence of polyacrylic acid, which is hydrophilic and is a good gelling agent of water. Nevertheless, other combinations of polymer and membrane should lead to other useful modifications of the intrinsic behavior of the membrane material.

One embodiment of the present invention involves the incorporation of polymers that form gels in selected solvents. As stated previously, polyacrylic acid and other polyelectrolytes gel water. Another example would be a polymer derived from a vinyl monomer with a pendant hydrocarbon or fluorocarbon substituent, which would gel organic solvents. The advantage of using gelled solvents supported by a polymer in the pore structure of the membrane is that a gelled solvent can withstand higher pressure gradients without being displaced from the pore structure compared with the ungelled liquid. The gelling of a liquid has only minor influence on diffusion rates of small molecules and/or carriers in the liquid. The liquid becomes the transport medium when the membrane is used for separations. A carrier can also be dissolved in the liquid to facilitate transort of molecules being separated in the liquid medium.

Monomers that can be used in this case include but are not limited to acrylates and methacrylates of higher alcohols having up to about 24 carbon atoms, including fluorinated derivatives. Examples include, but are not limited to, acrylates and methacrylates of linear and branched alcohols having up to about 24 carbon atoms, such as 1-decanol, 1-dodecanol, cetyl alcohol, n-octadecyl alcohol, n-docosyl alcohol, and 3,7-dimethyl-1-octanol. The polyacrylates of cetyl alcohol, n-octadecyl alcohol, and n-docosyl alcohol, form gels with several alcohols having from 7 to 12 carbons in their molecular formula and with several hydrocarbons having from 6 to 16 carbons in their molecular formula, as reported by R. V. Tal'roze, et al in *J. Polymer Sci.*, Symposium No. 44, pp 35-47 (1974), incorporated herein by reference. Examples of fluorinated monomers include 1H,1H,11H-eicosafluoroundecyl acrylate and methacrylate and 1H,1H-pentadecafluorooctyl acrylate and methacrylate, all of which are commercially available from PCR, Inc., Gainesville, Fla. These polymers should form gels with fluorocarbon solvents. The acrylates and methacrylates are readily made by standard methods of esterification from the alcohols and acrylic acid or methacrylic acid derivatives, such as the acid chlorides. Styrene derivatives based on ethers of hydroxystyrene with the alcohols named above can also be used. In addition, vinyl esters of higher acids (up to about $C_{24}$), including fluorinated derivatives, can also be used. These would include, but are not limited to, vinyl esters of lauric acid, oleic acid, decanoic acid, 11H-eicosafluoroundecanoic acid, and perfluorooctanoic acid. These vinyl esters also can be readily synthesized by methods well-known in the art.

Initiators are chosen such that they can be mixed with the reactive polymerizable monomer and then incorporated into the pores of the microporous membrane prior to polymerization. Polymerization is conveniently induced by activating the initiator with an energy source that will cause it to bring about polymerization of the vinyl monomers. Selection of the initiator is based on such factors as the kind of vinyl monomer being activated, the solvent (if any), and the kind of energy. Initiators can be selected that will induce polymerization upon exposure to heat, ultraviolet or visible light, gamma or electron beam irradiation, or combinations thereof. In general, because the preferred monomers are readily subjected to free radical polymerization, the most convenient initiators are free radical initiators, with the preferred means of activation being heat. This is exceptionally convenient because a large number of free radical initiators are commercially available, each of these having a known temperature range that will initiate polymerization. Several classes of free radical initiators are commonly used because of their commercial availability. These include azo initiators, which have the following general formula:

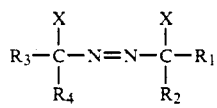

wherein X is a cyano, ester, or carboxylic acid group, and $R_1$, $R_2$, $R_3$, and $R_4$ are selected from alkyl and alicyclic groups, alicyclic residues wherein $R_1$ and $R_2$ are part of a cyclic structure, alicyclic residues wherein $R_3$ and $R_4$ are part of a cyclic structure, and carboxylic acid residues, such as $-CH_2CH_2COOH$. Other preferred initiators include peroxy compounds, which have the general formula:

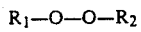

wherein $R_1$ and $R_2$ are selected from the group alkyl (e.g. di-t-butyl peroxide), acyl (e.g. diacetyl peroxide), aroyl (e.g. benzoyl peroxide), and hydrogen (e.g. alkyl hydroperoxides or hydrogen peroxide). Other commonly used free radical initiators that can be used in the present invention include peroxycarbonates and peroxalates. Inorganic initiators also may be used, as for example potassium persulfate. In addition, optional transition metal salts, such as ferrous ion, can be added to hydrogen peroxide, alkyl hydroperoxides, or potassium persulfate to accelerate the reaction by formation of what is commonly referred to as a "redox" system by those skilled in the art. Preferred initiators in the present invention include 2,2'-azobis(2,4-dimethylvaleronitrile), 4,4'-azobis(4-cyanovaleric acid), and benzoyl peroxide, with benzoyl peroxide being the most preferred for use with acrylic acid in toluene.

Free radical polymerization can also be induced without any initiator at all by using an electron beam or gamma-irradiation. In this embodiment, the pores of the membrane are filled with the polymerizable monomers, neat or in solution. Polymerization is then induced by exposure to an electron beam or a source of gamma-radiation, the most common source being $^{60}Co$.

The polymerizable vinyl monomer (or monomers) and the initiator, if used, are incorporated into the pores of the microporous membrane as a liquid solution. A solvent may be used, but is not required, provided that the monomer (or monomers) without solvent wets the pores. The solvent must be compatible with the polymerization mechanism. For example, solvents that inhibit free radical polymerizations or lead to excessive chain transfer would be unsuitable for use with radical initiators. The initiator, monomer (or monomers), and solvent, if used, must form a homogeneous solution at the concentrations chosen. Organic solvents may be used in the present invention. Organic solvents that may be used include, but are not limited to, low boiling alcohols, aromatic hydrocarbons, aliphatic hydrocarbons, naphtha spirits, silicone oil, and mixtures thereof, the most important limitation being that the solution should be homogeneous and must wet the pores. A water solution can also be used as a solvent. An additive, such as a surfactant, or a water miscible organic solvent, such as an alcohol, will be needed to allow an easy wetting out of the membrane and pores for hydrophobic membranes. Water solutions are preferred in large scale operation. However for small samples an organic solvent may be used, with toluene being an excellent solvent for use with acrylic acid.

The concentration of vinyl monomer is preferably about 30% to about 100%, and with acrylic acid in toluene most preferably is about 50%. The concentration of initiator is about 0.1% to 1% by weight, and most preferably with acrylic acid in toluene is about 0.5%. With acrylic acid in toluene, the preferred initiator is benzoyl peroxide. The solutions in the preferred embodiments all wet out the pores of the substrate microporous membranes.

The vinyl monomer, along with initiator and solvent, if used, can be incorporated into the pores of the membrane by any process that results in immersion of the microporous membrane in a liquid solution or in vapors of the monomer, if conditions are established so that the monomer can condense in the pores of the membrane. The simplest method, and also the preferred method, for incorporating the monomer into the pores of the membrane is to immerse the membrane into a liquid solution of monomer, along with initiator and solvent, if used. In a manufacturing process, this might involve passage of the membrane film through the monomer solution by feeding it from a roll, followed by initiation under conditions in which premature loss of solvent and/or monomer due to evaporation is avoided, after which the membrane is collected on a take-up roll. In a laboratory preparation, a strip of membrane is immersed in the solution in a container.

Polymerization is brought about by exposure of the membrane and monomer to conditions that will activate the initiator. Typical conditions, depending on the initiator used, are heat, ultraviolet light, visible light, electron beam, and gamma-irradiation. As stated previously, gamma-irradiation or an electron beam can induce free radical polymerizations in the absence of an initiator. The preferred method for polymerizing the vinyl monomers is application of heat to an azo initiator or a peroxide initiator. In embodiments using benzoyl peroxide as the initiator, the preferred temperature range is about 70° C. to about 90° C., with the range of about 88° to about 90° being most preferred. Under these conditions, the time needed to achieve polymerization is about 4 to 7 hours. Variations in temperature and initiator can significantly alter the polymerization rate when shorter or longer times are desired.

In order to avoid evaporation of the solvent and monomer during polymerization, the polymerization step will generally be conducted in a closed system. This can consist of carrying out the polymerization in a closed chamber in which the atmosphere is saturated with the monomer and solvent. A simpler method for smaller samples is to carry out the polymerization between two flat plates so that the surfaces of the membrane are not exposed to the atmosphere. In the examples hereinafter, the two flat plates are placed in an oven. To avoid sticking, hydrophilic glass plates were used for polymerizations of acrylic acid in toluene within the pores, and teflon coated plates were used for polymerizations of neat acrylic acid contained in the pores. In a manufacturing setting, the parallel surfaces may be heated rollers or closely spaced heated plates, with the membrane containing incorporated monomer passing between; in this case, the initiator and temperature would have to be adjusted to achieve a faster polymerization.

In another embodiment of the invention, a vinyl crosslinking agent is also included in the polymerization reaction. A vinyl crosslinking agent is herein defined as a compound whose molecular structure contains two or more polymerizable functional groups, with the functional groups being selected from the group consisting of acrylate, methacrylate, vinyl ether, vinyl aromatic, vinyl ester, and mixtures thereof. A suitable crosslinking agent is trimethylolpropane triacrylate (TMPTA). Other crosslinking agents that can be used include, but are not limited to, tripropylene glycol diacrylate, hexanediol diacrylate, tetraethylene glycol diacrylate, pentaerythritol triacrylate, glyceryl propoxytriacrylate, trimethylolpropane ethoxy triacrylate, and trimethylolpropane trimethacrylate, all of which are commercially available. Preferably, the concentration of monofunctional monomer (or monomers) in solution is about 15% to about 60% by weight, the concentration of multifunctional monomer (or monomers) is up to about 10 mol % of the monofunctional monomer or monomers) concentration, and the concentration of initiator is about 0.1 mol % to about 1.5 mol % of the monofunctional monomer (or monomers) concentration. Most preferably, the concentration of monofunctional monomer (or monomers) is about 25% to about 60% by weight, the concentration of multifunctional monomer (or monomers) is about 0.1 to about 5 mol % of the monofunctional monomer (or monomers), and the concentration of initiator is about 0.1 mol % to about 0.6 mol % of the monofunctional monomer (or monomers) concentration. Conditions for incorporating the solution in the pores and polymerizing the monomers are the same as for the embodiments based on monofunctional vinyl monomers.

The product that results from the process described herein has many unique properties. The surface properties of the pore modified membranes, specifically wettability, are altered to those of the polymer incorporated within the pores. The incorporated polymer is firmly anchored within the pores and is not removed, even under severe conditions, as for example, the conditions that are encountered during ultrasonication. The presence of the incorporated polymer can be observed under a scanning electron microscope. Alterations in pore size can be observed by mercury porosimetry. In general, there are more pores which are typically smaller in size.

A particularly unique feature of the modified membranes is that in the cases where the incorporated polymer forms a gel with a specific liquid, the combination of the membrane and incorporated gel is an improved liquid membrane. The gel holds the liquid within the microporous structure, and the liquid can be used as an active medium for separations. The liquid can optionally also contain a dissolved carrier to further enhance the utility of the liquid membrane for specific separations. In the case of polyacrylic acid and other highly hydrophilic polymers, the gelled liquid is generally water. When a hydrophobic monomer is used, organic solvents can be gelled. For example, acrylate and methacrylate polymers of long chain alcohols (up to about $C_{24}$) form gels with higher alcohols and hydrocarbons (up to about $C_{16}$). Polyalkoxystyrenes in which the alkoxy groups are derived from long chain alcohols should also form gels with hydrocarbons and alcohols. Polyvinyl esters in which the ester groups are derived from long chain acids should also gel many organic solvents. Polyacrylates and polymethacrylates of fluorinated long chain alcohols should form gels with fluorocarbons. Fluorinated derivatives of polyalkoxystyrenes and polyvinylesters should also gel with certain fluorocarbons. Liquid membranes which are constructed in this way are stable and can be used for liquid separations under higher pressure gradients and fluxes than liquid membranes using ungelled liquids.

A preferred embodiment for use as a liquid membrane comprises a polypropylene microporous membrane the pores of which have been modified by a hydrophilic polymer optionally with a crosslinking agent. This modified membrane is water wettable, even after sonication. The pore modified membrane can withstand a high pressure gradient across the membrane, and is capable of sustaining a water flux under pressure. The membrane also exhibits a low electrical resistance.

The examples that are presented hereinafter provide a more detailed description of the method for making the invention in some of its preferred embodiments, both without a crosslinking agent (Examples 1-7) and with a crosslinking agent (Examples 8-49). Example 50 illustrates the preparation of a microporous polypropylene membrane in which a lipophilic acrylate is incorporated. Example 51 illustrates the high molecular weight of the incorporated polymers. Subsequent examples (52-56) illustrate the unique properties of hydrophilic pore-modified membranes.

EXAMPLES 1-7

Examples 1-7 illustrate the polymerization of acrylic acid in the pores of Celgard ® 2500 microporous membrane, which is made of isotactic polypropylene and which is manufactured by Hoechst Celanese Corporation. The Celgard ® 2500 used in these examples had an average thickness of 0.25 microns and a porosity of 45%. Pore dimensions were measured on a scanning electron microscope to be 0.04×0.4 microns. For Examples 1-5, solutions of acrylic acid and benzoyl peroxide, the initiator, were made up in toluene at the weight % acrylic acid concentrations shown in Table 1. The benzoyl peroxide concentrations were all 0.5 mol % of the acrylic acid. In Examples 6 and 7, no solvent was used; the benzoyl peroxide concentrations in acrylic acid were 0.5 mol % of the acrylic acid. Celgard ® samples (about 1½"×3½") were immersed in the solutions of monomer and initiator so that the Celgard ® was completely wetted by the solution. The wetted Celgard ® samples were then quickly placed between two hydrophilic glass plates, which were clamped together to prevent evaporation of the solution. The glass plates had been made hydrophilic prior to these experiments by soaking them in a 50% solution of acetone in water for 10 minutes, then ultrasonicating them in 50% nitric acid in water for 10 minutes, and finally rinsing them with water. The glass plates with the wetted membranes were placed in a nitrogen purged oven at the temperature shown in Table 1 for four hours. In Experiments 6 and 7, the polymerization procedure was different in that the wetted membranes were placed between pairs of plates covered with teflon foil to prevent the glass plates from sticking to one another after polymerization.

After the polymerizations were complete, the membrane samples were evaluated for water wettability by first immersing them in aqueous methanol and observing whether the aqueous methanol solution wets the membranes. Aqueous methanol does not wet untreated Celgard ®. Those samples that were wetted by aqueous methanol were then immersed in pure water, and the wetting behavior was again observed. If the membranes were wetted by aqueous methanol but not by pure water, their wettability was judged to be "partial" in Table 1. If they were wetted by aqueous methanol and pure water, their wettability was judged to be "complete" in Table 1.

The treated membrane samples were then placed in a 50% ethanol/water solution and ultrasonicated for a total of 45 minutes in three 15 minute intervals. Ultrasonication consisted of treatment with ultrasound in a Bransonic 52 ultrasonication bath. The wetting behavior was again evaluated by the procedure described earlier. It is believed that samples that lost all or part of their wetting behavior on ultrasonication did so because the ultrasonication removed a critical amount of or all polyacrylic acid from the pores of the membrane. The results of these seven experiments are summarized in Table 1.

It is apparent in Table 1 that a minimum concentration of about 50-60% acrylic acid is necessary at 0.5% initiator concentration when toluene is the solvent before polymerization leads to a wettable membrane that stands up to the rigorous ultrasonication conditions. For other combinations of monomer, initiator and solvent and for other membranes, different sets of conditions may be necessary to yield a polymer in the pores that does not wash out under conditions of severe agitation. The specific conditions used in Examples 1-7 should not be viewed as limiting the scope of the invention.

TABLE 1

Polymerization of Acrylic Acid in Celgard ® 2500

| Example Number | Temperature | Time | Acrylic Acid Concentration | Wettability After: Reaction | Wettability After: Sonication |
|---|---|---|---|---|---|
| 1 | 70° C. | 4 hrs. | 30% | partial | none |
| 2 | 88° C. | 4 hrs. | 30% | none | — |
| 3 | 88° C. | 4 hrs. | 40% | complete | none |
| 4 | 88° C. | 4 hrs. | 50% | complete | partial |
| 5 | 88° C. | 4 hrs. | 60% | complete | complete |
| 6 | 90° C. | 4 hrs. | 100% | complete | complete |
| 7 | 88° C. | 7 hrs. | 100% | complete | complete |

EXAMPLES 8-49

These examples were performed according to the same basic procedure as was used in Examples 1-7. In these examples, trimethylolpropane triacrylate (TMPTA), a crosslinking agent by virtue of the fact that it is a trifunctional vinyl monomer, was also included in the composition. Solutions of acrylic acid, TMPTA, and benzoyl peroxide in toluene were formulated in the concentrations listed in Table 2. The acrylic acid concentration in Table 2 is presented as a wt % of the total solution, the concentration of TMPTA is presented as a mol % of the amount of acrylic acid, and the concentration of benzoyl peroxide is presented as a mol % of all acrylate (Each TMPTA is counted as three acrylates). These solutions were then incorporated into Celgard ® 2500 membranes using the same procedure as was used in Examples 1-7. The microporous membranes when immersed in the solutions were wetted by the solutions. The wetted membranes were then placed between hydrophilic glass plates and heated in a nitrogen purged oven for four hours at 88°-90° to induce polymerization. Except for the time and temperature, the polymerization procedure was the same as in Examples 1-7. The membranes were then evaluated for water wettability, followed by ultrasonication and reevaluation for wettability using the procedure described for Examples 1-7. (The abbreviation "RXN" in Table 2 stands for "Reaction"). Concentrations and experimental results are presented in Table 2.

In Table 2 it is apparent that a wettable membrane that is stable to ultrasonication is achieved when the concentration of acrylic acid in toluene is within a range starting at about 15-20% by weight and extending up to about 60%, when TMPTA is present in an amount up to between about 5 mol % and 10 mol % of the acrylic acid, and when benzoyl peroxide is present in an amount between about 0.1 mol % and about 0.5 to 1 mol % of the total acrylate, or approximately 0.1 mol % to 1.5 mol % of the acrylic acid. The range of concentrations that most consistently gives fully wettable membranes both immediately after reaction and also after ultrasonication according to Table 2 is for solutions having about 25%-60% acrylic acid by weight, with TMPTA in a concentration range of about 0.1 mol % to about 5 mol % of acrylic acid and benzoyl peroxide in a range of about 0.1 mol % to about 0.5 mol % of the total acrylate or approximately 0.1 mol % to 0.6 mol % of the acrylic acid.

TABLE 2

Polymerization of Acrylic Acid/TMPTA in Celgard ® 2500

| | Concentration | | Wettability After: | |
|---|---|---|---|---|
| Example Number | Acrylic Acid wt % | TMPTA (mol % of Acrylic Acid) | Benzoyl Peroxide (Mol % of All Acrylate) | RXN | Sonication |
| 8 | 10% | 0.1% | 0.5% | None | — |
| 9 | 15% | 0.1% | 0.1% | None | — |
| 10 | 15% | 0.1% | 0.5% | None | — |
| 11 | 15% | 1% | 0.1% | None | — |
| 12 | 15% | 1% | 0.5% | None | — |
| 13 | 15% | 10% | 0.05% | None | — |
| 14 | 15% | 10% | 0.1% | None | — |
| 15 | 15% | 10% | 0.5% | None | — |
| 16 | 20% | 0.1% | 0.1% | Partial | Partial |
| 17 | 20% | 0.1% | 0.5% | Partial | Partial |
| 18 | 20% | 1% | 0.1% | Complete | Complete |
| 19 | 20% | 1% | 0.5% | Partial | Partial |
| 20 | 20% | 5% | 0.1% | None | — |
| 21 | 20% | 10% | 0.1% | None | — |
| 22 | 20% | 10% | 0.5% | Partial | None |
| 23 | 21% | 1% | 0.5% | Partial | Partial |
| 24 | 23% | 0.96% | 0.48% | Partial | Partial |
| 25 | 23% | 1% | 0.5% | Complete | Complete |
| 26 | 23% | 1% | 0.5% | Complete | Complete |
| 27 | 24% | 1% | 0.5% | Complete | Complete |
| 28 | 25% | 0.1% | 0.1% | Complete | Complete |
| 29 | 25% | 0.01% | 0.5% | Partial | None |
| 30 | 25% | 0.1% | 0.5% | Complete | Complete |
| 31 | 25% | 0.1% | 0.5% | Complete | Complete |
| 32 | 25% | 1% | 0.5% | Complete | Complete |
| 33 | 25% | 5% | 0.5% | Complete | Complete |
| 34 | 30% | 1% | 0.49% | Complete | Complete |
| 35 | 30% | 10% | 0.38% | Complete | None |
| 36 | 30% | 1% | 0.49% | Complete | Complete |
| 37 | 30% | 0.01% | 0.5% | Complete | None |
| 38 | 30% | 0.1% | 0.1% | Complete | Complete |
| 39 | 30% | 0.1% | 0.5% | Complete | Complete |
| 40 | 30% | 1% | 0.1% | Complete | Complete |
| 41 | 30% | 1% | 0.5% | Complete | Complete |
| 42 | 30% | 5% | 0.5% | Complete | Complete |
| 43 | 30% | 10% | 0.1% | Partial | None |
| 44 | 30% | 10% | 0.5% | Complete | None |
| 45 | 30% | 10% | 1% | Complete | None |
| 46 | 40% | 0.1% | 0.5% | Complete | Complete |
| 47 | 50% | 0.1% | 0.5% | Complete | Complete |
| 48 | 60% | 0.01% | 0.5% | Complete | Complete |
| 49 | 60% | 0.1% | 0.5% | Complete | Complete |

EXAMPLE 50

A strip of Celgard ® 2500 polypropylene microporous membrane is immersed in an approximately 30% by weight solution of 1-hexadecyl acrylate, obtained from Polysciences, Inc., further containing a crosslinking agent, such as trimethylolpropane triacrylate or divinylbenzene, (about 2.5 mol % compared with 1-hexadecyl acrylate) and benzoyl peroxide (about 0.25 mol % compared with 1-hexadecyl acrylate), so that the microporous membrane is completely wetted. The wetted sample is then placed between two glass plates and heated in a nitrogen purged oven at about 90° C. for 4 hours to yield a microporous membrane in which crosslinked poly-1-hexadecyl acrylate is incorporated and which will gel hydrocarbon solvents.

EXAMPLE 51

A solution was made up containing 10% by weight of acrylic acid in toluene and 0.5 mol % (compared with acrylic acid) of benzoyl peroxide. This was stirred at 60° C. for three hours under a nitrogen purge. The polymer that resulted was separated from the toluene by filtration and then analyzed for molecular weight by HPLC, using tetrahydrofuran as a solvent. The weight average molecular weight was determined to be 60,000. These polymerization conditions are similar to those that resulted in stable pore modified membranes, suggesting that a molecular weight of about 60,000 is sufficient to achieve stable pore modified membranes.

EXAMPLES 52-56

The following set of examples illustrates some of the unique properties of the polypropylene microporous membranes which have been modified by polymerizing acrylic acid in the pores. Physical properties can be modified for specific applications by those skilled in the art by following the teachings herein and by using different combinations of vinyl monomers and microporous membranes.

EXAMPLE 52

Water flux was measured through two control membranes and three experimental samples by measuring the flow of water under 50 psi of pressure. Celgard ® 2500 microporous membrane showed a water flux of 0; no water passed through the membrane because of the hydrophobicity of the membrane. Celgard ® 3501 microporous membrane, a commercial product which has been treated with a surfactant to make it hydrophilic, initially showed a flux of 88 ml/hr-cm$^2$. After it was sequentially removed from the water, dried, and reimmersed five times during the flux measurements, and after water flux was measured for a total of 18 minutes between dryings, the flux decreased to about 9 ml/hr-cm$^2$. Measurement of the flux of the pore modified membrane of Example 39 varied from 0.026 to 0.046 ml/hr-cm$^2$ over a period of 7 hours. The membrane of Example 31 exhibited a flux varying from 0.056 to 0.091 ml/hr-cm$^2$ when measured several times over a period of 22 hours. The membrane of Example 32 exhibited a flux varying from 0.045 to 0.047 ml/hr-cm$^2$ when the flux was measured three times during a period of 6 hours. The flux measurements of the three experimental samples varied randomly between measurements but did not exhibit an upward or downward trend, indicating that the membranes were stable. The low flux is believed to be the result of the pores being filled with a gel of polyacrylic acid and water. Since the transport rates of small solutes or ions are known to be only slightly affected by gelation of the solvent, the reduced fluxes are not a detriment.

EXAMPLE 53

Tests were carried out to determine the capability of the gelled liquid in the membranes to withstand air pressure gradients, which is of importance for liquid membranes. This was done by wetting the samples to be tested with pure water and then placing the samples in a Millipore pressure cell (catalog #XX4404700). Compressed gas was applied to one side of the cell. To the other side of the cell was attached a piece of hollow tubing with its free end submerged in water. Gas pressure was increased on the high pressure side of the cell until gas passed through the membrane, as indicated by gas bubbling out of the end of the tubing that is submerged in water. Gas was expected to flow through the pores of the membrane when the pressure was great enough to blow the water out of the polyacrylic gel or by disruption of the pore-polyacrylic acid gel system. These experiments were performed at pH values of 7, 9, and 11. The pH of the pure water was adjusted with KOH.

These experiments were carried out on membrane samples that were made according to the procedure of Example 31. For comparison, the Celgard ® 3501 microporous membrane was tested under the same conditions. Celgard ® 3501 is the polypropylene microporous membrane which has been made hydrophilic by treatment with surfactant. Seven membrane samples made by the procedure of Example 31 were subjected to pressure tests at each pH; the pressures at which gas leaked through ranged from 85-285 psi at pH 7, 7-290 psi at pH 9, and 0 to at least 290 psi at pH 11. All samples with low pressure readings showed macroscopic damage (splits) after testing. For comparison, the pressures at which Celgard ® 3501 allowed gas to leak through in triplicate runs ranged from 61-62 psi at pH 7, 71-74 psi at pH 9, and 70-72 psi at pH 11. It is evident that the pore modified samples that were free of macroscopic damage were stable to gas leakage to a pressure gradient of about 285-290 psi, whereas the unmodified samples were only stable to the much lower pressure of about 60-70 psi.

EXAMPLE 54

Celgard ® 2500 and several of the pore modified membrane samples were examined on a scanning electron microscope (SEM) at magnifications up to 100,000×. These SEM experiments confirmed that Celgard ® 2500 has arrays of parallel elongated pores with dimensions of about 0.02-0.75 microns in the long direction and about 0.1 microns in width.

The pore-modified membrane of Example 28 was examined after it was made but before ultrasonication. SEM analysis revealed that most of the pores were partly or completely filled with a foreign substance, which is presumed to be polyacrylic acid with TMPTA crosslinker. The shape of many of the pores was also altered, presumably due to distortions resulting from the presence of polymer. The pore modified membranes of Examples 31 and 32 were examined by microscopy after repeated exposure to ultrasonic washings. The membrane of Example 32 was similar in appearance to the membrane of Example 28, showing the pores to be partly filled with polymer, even after ultrasonication, and again showing some of the pores to be distorted. These observations are consistent with the fact that the above membranes are all water wettable and retain their wettability even after treatment with ultrasonic washings. These membranes are white in appearance, which is consistent with the SEM observation that there is still some void space in the pores. If there were little or no void space, the membranes would have been transparent or translucent.

For comparison, an SEM micrograph was made of the membrane of Example 44 after repeated ultrasonication in water-ethanol. The pores of this membrane had been filled with polymer containing a large amount of TMPTA crosslinker (10 mol % of the amount of acrylic acid) and had lost its wettability after exposure to ultrasound. The SEM micrograph revealed only small aggregates of polymer scattered throughout the porous network. The highly crosslinked polymer apparently was removed from the porous network during ultrasonic treatment, perhaps because the crosslinked polymer particles were brittle or because the particles were smaller than the pore size because of their high crosslink density.

Finally, an SEM micrograph was taken of the pore modified membrane of Example 6, which had been made using neat acrylic acid without solvent or a crosslinking agent. The membrane had been repeatedly exposed to ultrasonic washings before the SEM was taken, and it still retained its wettability. The SEM indicated that the pores were almost completely filled. This observation is consistent with the fact that this membrane is translucent and thus has few or no air-filled voids.

The SEM data indicate that variations in composition of the monomer solution affect the ultimate morphology and properties of the pore modified membrane.

EXAMPLE 55

Pore size distributions were measured to determine how the pore sizes are affected by the presence of polymers in the pores. These measurements were carried out by the technique of mercury porosimetry using a Quantachrome Autoscan Mercury Porosimeter. Two samples were evaluated: a Celgard ® 3501 membrane and the pore modified membrane of Example 31. The Celgard ® 3501 membrane sample had a pore volume of about 0.72 cc/gm while the membrane of Example 31 had a total pore volume of about 0.57 cc/gm. The surface areas were also different, with the Celgard ® 3501 membrane having a surface area of about 16.7 $m^2$/gm and the pore modified membrane sample of Example 31 having a surface area of about 21.9 $m^2$/gm. Thus the pore modified membranes have less internal free volume, as would be expected, and also a greater surface area within the pores. Finally, when the data were converted to a plot of Pore Number Fraction vs. Pore Size (i.e., a plot of what fraction of the pores are a particular size), it could be seen that the Celgard ® 3501 control sample had the greatest number of pores distributed at about 1200 Å and a lower but relatively constant number fraction of pores over the range of about 200-900 Å. On the other hand, the pore modified membrane of Example 31 had a somewhat broader distribution peaking at about 500 Å, with most of the pores being distributed in the range smaller than 500 Å.

EXAMPLE 56

The electrical resistance of the pore modified membrane of Example 31 was measured and compared with the resistance of two controls, Celgard ® 2500 and Celgard ® 3501 microporous membranes, wherein Celgard ® 3501 is a membrane that has been treated with a surfactant to make it water wettable. The measurements were carried out by clamping the membrane sample to be tested into an electrochemical cell so that it separated the electrolytes of the two half-cells. The electrolyte was 1M KCl with the pH adjusted using KOH to 6.5 and 9.0 for two different measurements. Each half-cell was equipped with a platinum wire electrode. A DC current of 40 mA was passed between the two electrodes through the membrane; and the voltage needed to maintain that current was measured. The applied voltage was measured several times in both directions, and the absolute values of the voltages were averaged.

After average voltage drops were corrected for the electrolyte resistance, the membrane resistances were calculated by multiplying the corrected voltages by the membrane area and dividing by the current. The membrane resistances for the two controls and the pore modified membrane are summarized in Table 3.

TABLE 3

| | Membrane Electrical Resistances | |
|---|---|---|
| | Resistance (mΩ · in$^2$) | |
| Sample | pH 6.5 | pH 9.0 |
| Celgar ® 2500 | 44.6 ± 3.9 | 26.3 ± 18.6 |
| Celgar ® 3501 | 81.2 ± 38.5 | 34.5 ± 7.4 |
| Example 31 | 209 ± 83 | 301 ± 122 |

The data in Table 3 indicate that the modified membranes have a somewhat higher resistance than the microporous polypropylene membranes. The higher resistance at high pH is consistent with the fact that the ionic groups are carboxylic acids. At higher pH, the carboxylate groups are expected to be fully ionized and to therefore interfere with the passage of negatively charged chloride ions. For use as a battery separator, incorporation of a nonionizable hydrophilic polymer would be preferred, such as polyacrylamide.

It is to be understood that the above-described embodiments of the invention are illustrative only and that modification throughout may occur to those skilled in the art. Accordingly, this invention is not to be regarded as limited to the embodiments disclosed herein, but is to be limited and defined only by the appended claims.

What is claimed is:

1. A process for producing a hydrophilic pore modified microporous membrane from a hydrophobic microporous membrane comprising the steps of:
    (a) providing a hydrophobic microporous membrane;
    (b) incorporating at least one polymerizable vinyl monomer, which when polymerized yields a hydrophilic polymer, and a polymerization initiator within the pores of said microporous membrane; and
    (c) polymerizing said vinyl monomer to yield a polymerized monomer with sufficient molecular weight that said polymerized monomer is secured in said pores.

2. The process of claim 1 wherein said polymerized monomer has a weight average molecular weight of at least 60,000.

3. The process of claim 1 wherein said step of incorporating a polymerizable vinyl monomer and a polymerization initiator comprises placing said microporous membrane into a solution containing said polymerizable vinyl monomer and said polymerization initiator.

4. The process of claim 1 wherein said hydrophobic microporous membrane is composed of a material selected from the group consisting of polyolefins, fluorinated polyolefins, and mixtures thereof.

5. The process of claim 1 wherein said microporous membrane is composed of polypropylene.

6. The process of claim 1, wherein said polymerizable vinyl monomer comprises at least one monofunctional vinyl monomer.

7. The process of claim 6 wherein said monofunctional vinyl monomer is selected from the group consisting of acrylic acid, methacrylic acid, acrylamide, methacrylamide, and vinyl acetate.

8. The process of claim 6 wherein said monofunctional vinyl monomer is acrylic acid.

9. The process of claim 6 wherein said microporous membrane consists essentially of polypropylene, said monofunctional vinyl monomer comprises acrylic acid, and said initiator comprises benzoyl peroxide.

10. The process of claim 6 wherein the concentration of said monofunctional vinyl monomer is about 30% to 100% by weight, the balance being a solvent and said initiator in the amount of about 0.1% to about 1% by weight of the amount of said monofunctional vinyl monomer.

11. The process of claim 10 wherein the concentration of said monofunctional vinyl monomer is greater than about 50% and the concentration of said initiator is about 0.5%.

12. The process of claim 1 wherein said initiator polymerizes said monomer during exposure to conditions selected from the group heat, ultraviolet light, visible light, electron beam irradiation, gamma-irradiation, and combinations thereof.

13. The process of claim 1 wherein said initiator is a free radical initiator.

14. The process of claim 13 wherein said free radical initiator is selected from the group consisting of azo initiators, alkyl peroxides, aryl peroxides, acyl peroxides, aroyl peroxides, and mixtures thereof.

15. The process of claim 1 wherein said initiator is benzoyl peroxide.

16. The process of claim 1 wherein said polymerizable vinyl monomer and said polymerization initiator are dissolved in a solvent.

17. The process of claim 16 wherein said solvent is selected from the group consisting of low boiling alcohols, aromatic hydrocarbons, aliphatic hydrocarbons, naphtha spirits, silicone oil, water containing a wetting agent, and mixtures thereof.

18. The process of claim 16 wherein said solvent is toluene.

19. The process of claim 1 wherein said polymerizable vinyl monomer comprises a monofunctional monomer and a crosslinking agent, said crosslinking agent containing two or more polymerizable vinyl functional groups on each molecule, said functional groups being selected from the group consisting of acrylate, methacrylate, vinyl ether, vinyl aromatic and vinyl ester.

20. The process of claim 19 wherein said crosslinking agent is trimethylolpropane triacrylate.

21. The process of claim 19 wherein said microporous membrane consists essentially of polypropylene, said monofunctional vinyl monomer comprises acrylic acid, said crosslinking agent comprises trimethylolpropane triacrylate, and said initiator comprises benzoyl peroxide.

22. The process of claim 19 wherein said monofunctional vinyl monomer, said crosslinking agent and said initiator are dispersed in a solvent, and wherein the concentration of said monofunctional vinyl monomer is about 15% to about 60% by weight, the concentration of said crosslinking agent is up to about 10 mol % of said monofunctional monomer, and the concentration of said initiator is about 0.1 to about 1.5 mol % of said monofunctional vinyl monomer.

23. The process of claim 19 wherein said monofunctional vinyl monomer, said crosslinking agent and said initiator are dispersed in a solvent, and wherein the concentration of said monofunctional monomer is about 25% to about 60% by weight, the concentration of said crosslinking agent is about 0.1 to about 5 mol % of said monofunctional vinyl monomer, and the concentration of said initiator is about 0.1 to about 0.6 mol % of said monofunctional vinyl monomer.

24. The process of claim 1 wherein said step of polymerizing said polymerizable vinyl monomer is performed by heating at a temperature of about 70°–90° C. for about 4 to about 7 hours.

25. The process of claim 1 wherein said polymerization reaction is conducted in a closed system.

26. The process of claim 25 wherein said closed system comprises two surfaces positioned, dimensioned and configured so that said microporous membrane is between two said surfaces for at least a portion of said polymerization step.

27. A process for producing a hydrophilic pore modified microporous membrane from a hydrophobic microporous membrane comprising the steps of:
(a) providing a hydrophobic microporous membrane;
(b) incorporating at least one polymerizable vinyl monomer within the pores of said microporous membrane; and
(c) polymerizing said vinyl monomer by exposure to a radiation source selected from gamma-radiation and electron beam radiation to yield a polymerized monomer with sufficient molecular weight that said polymerized monomer is secured in said pores.

28. A process for making a liquid membrane in a microporous support, comprising the steps of:
(a) providing a microporous membrane;
(b) incorporating at least one polymerizable monomer into the pores of said microporous membrane, said polymerizable monomer being selected from the group of monomers which after polymerization yield polymers that cooperate with at least one liquid to form a gel;
(c) polymerizing said monomer to obtain a polymer, wherein said polymer has sufficient molecular weight to be secured within said pores of said microporous membrane; and
(d) gelling said polymer with a liquid that forms a gel.

29. A hydrophilic pore modified membrane comprising:
(a) a hydrophobic microporous membrane;
(b) a hydrophilic polymer of composition different from the composition of said membrane, wherein said hydrophilic polymer is the product of a polymerization reaction of one or more polymerizable vinyl monomers under conditions that said polymer has sufficient molecular weight to be secured within the pores of said microporous membrane.

30. The pore modified membrane of claim 29 wherein said microporous membrane is composed of a material selected from the group consisting of polyolefins, fluorinated polyolefins, and mixtures thereof, and said polymer is selected from the group consisting of polyacrylic acid, polymethacrylic acid, polyvinyl acetate, polystyrene sulfonic acid, polyacrylamide, and polymethacrylamide.

31. The pore modified membrane of claim 30 wherein said polymer further comprises a crosslinking agent, wherein said crosslinking agent contains two or more polymerizable vinyl groups on each molecule, said polymerizable vinyl groups being selected from the group consisting of acrylate, methacrylate, vinyl ether, vinyl aromatic and vinyl ester.

32. The pore modified membrane of claim 31 wherein said crosslinking agent is trimethylolpropane triacrylate.

33. The pore modified membrane of claim 29 wherein said microporous membrane consists essentially of polypropylene and said polymer comprises polyacrylic acid.

34. The pore modified membrane of claim 29, wherein the porosity of said microporous membrane is about 30% to about 70%, the length and width of said pores are each about 0.01 to about 10 microns, and the average thickness of said microporous membrane is about 0.1 to 1 micron.

35. The pore modified membrane of claim 29 wherein the porosity of said microporous membrane is about 40% to about 50%, the length and width of said pores are about 0.2 to 0.6 microns and about 0.02 to about 0.06 microns respectively, and the average thickness of said microporous membrane is about 0.15 to about 0.35 microns.

36. The pore modified membrane of claim 29 wherein the molecular weight of said polymer is greater than about 60,000.

37. A liquid membrane support, comprising:
(a) a microporous membrane;
(b) a polymer of composition different from the composition of said membrane, said polymer being selected from the group of polymers that form gels with at least one liquid, said polymer being the product of a polymerization reaction of at least one polymerizable vinyl monomer under conditions that said polymer has sufficient molecular weight to be secured within the pores of said microporous membrane.

38. A liquid membrane, comprising the liquid membrane support of claim 37 and a liquid that forms a gel with said polymer of claim 37.

39. The liquid membrane as recited in claim 38, wherein said liquid further comprises a carrier to facilitate transport.

40. The liquid membrane support of claim 37, wherein said polymer is selected from the group consisting of alkyl esters of polyacrylic acid, alkyl esters of polymethacrylic acid, alkyl ethers of poly-hydroxystyrene, and mixtures thereof, the alkyl groups of said esters and ethers containing up to about 24 carbon atoms.

41. The liquid membrane support of claim 37, wherein said polymer is selected from the group consisting of fluoroalkyl esters of polyacrylic acid, fluoroalkyl esters of polymethacrylic acid, fluoroalkyl ethers of poly-hydroxystyrene, and mixtures thereof, the fluoroalkyl groups of said esters and ethers containing up to about 24 carbon atoms and from 1 to about 49 fluorine atoms bonded to the carbon atoms.

42. The liquid membrane support of claim 37, wherein said polymer is a polymer of a vinyl ester, the acid groups of said vinyl ester being one or more carboxylic acids having up to about 24 carbon atoms and having up to about 47 fluorine atoms bonded to the carbon atoms.

* * * * *